(12) United States Patent
Miura et al.

(10) Patent No.: US 7,526,111 B2
(45) Date of Patent: Apr. 28, 2009

(54) PERSONAL IDENTIFICATION DEVICE AND METHOD

(75) Inventors: Naoto Miura, Kokubunji (JP); Akio Nagasaka, Kokubunji (JP); Takafumi Miyatake, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 808 days.

(21) Appl. No.: 10/879,044

(22) Filed: Jun. 30, 2004

(65) Prior Publication Data

US 2005/0047632 A1 Mar. 3, 2005

(30) Foreign Application Priority Data

Aug. 26, 2003 (JP) .............................. 2003-300712

(51) Int. Cl.
*G06K 9/00* (2006.01)
(52) U.S. Cl. ...................... 382/126; 382/124; 382/125; 340/5.53; 340/5.83
(58) Field of Classification Search ................ 382/124, 382/125, 126; 340/5.53, 5.83; 356/71
See application file for complete search history.

(56) References Cited

U.S. PATENT DOCUMENTS

| | | | |
|---|---|---|---|
| 5,177,802 A | | 1/1993 | Fujimoto et al. |
| 5,635,723 A | * | 6/1997 | Fujieda et al. .............. 250/556 |
| 5,737,439 A | | 4/1998 | Lapsley et al. |
| 5,852,670 A | * | 12/1998 | Setlak et al. ................. 382/126 |
| 6,349,227 B1 | * | 2/2002 | Numada ..................... 600/310 |
| 6,522,773 B1 | | 2/2003 | Houdeau |
| 6,747,631 B1 | * | 6/2004 | Sakamaki et al. ........... 345/157 |
| 6,970,234 B2 | * | 11/2005 | Nagasaka et al. ............. 356/71 |
| 6,970,584 B2 | * | 11/2005 | O'Gorman et al. .......... 382/126 |
| 2001/0026632 A1 | | 10/2001 | Tamai |
| 2002/0048014 A1 | | 4/2002 | Kono et al. |

(Continued)

FOREIGN PATENT DOCUMENTS

DE 10046406 6/2001

(Continued)

OTHER PUBLICATIONS

Ko, et al., "A fully automated identification of coronary borders from the tree structure of coronary angiograms", vol. 39, No. 2, May 1995, pp. 193-208.

(Continued)

*Primary Examiner*—John B Strege
(74) *Attorney, Agent, or Firm*—Antonelli, Terry, Stout & Kraus, LLP.

(57) ABSTRACT

A personal identification device and method prevent the reduction in the finger vein recognition rate which otherwise occur due to erroneous insertion of a finger by a user not accustomed to operation or insertion of a false finger at low cost. The device includes an imager picking up an image of a finger vein pattern, a light source emitting light adapted to be transmitted through the finger, an image operating unit matches the image, guides indicating the position of picking up the finger image, a detector detecting the contact between the finger and the guides, another light source radiating light reflected from the thick of the finger, a switch which is depressed by the forward end of the finger, a further light source emitting light transmitted through the forward end of the finger, and a light-sensor receiving the light from the further light source through the finger.

11 Claims, 11 Drawing Sheets

U.S. PATENT DOCUMENTS

2003/0016345 A1    1/2003    Nagasaka et al.
2003/0063783 A1    4/2003    Higuchi
2004/0252867 A1*   12/2004    Lan et al. .................. 382/124

FOREIGN PATENT DOCUMENTS

| | | |
|---|---|---|
| EP | 0387522 | 9/1990 |
| EP | 1187055 | 3/2002 |
| EP | 1 251 448 A1 | 10/2002 |
| JP | 07-021373 | 1/1995 |
| JP | 2001-043190 | 2/2001 |
| JP | 2001-273497 | 10/2001 |
| JP | 2001-273498 | 10/2001 |
| JP | 2002-083298 | 3/2002 |
| JP | 2002-297549 | 10/2002 |
| JP | 2003-006627 | 1/2003 |
| JP | 2003-030632 | 1/2003 |
| KR | 1020030020152 | 3/2003 |
| WO | WO 01/59690 A1 | 8/2001 |

OTHER PUBLICATIONS

Miles, et al., "Matched filter estimation of serial blood vessel diameters from video images", vol. 12, No. 2, Jun. 1993, pp. 147-152.

Pappas, et al., "A New Method For Estimation Of Coronary Artery Dimensions In Angiograms", vol. 36, No. 9, Sep. 1, 1988, pp. 1501-1513.

Wysoski, et al., "A Rotation Invariant Approach on Static-Gesture Recognition Using Boundary Histograms and Neural Networks", vol. 4, Nov. 18, 2002, pp. 2137-2141.

Ohara, et al., "Face Identification Using an Omnidirectional Image Sequence", vol. 1 of 3, Sep. 30, 2002, pp. 275-280.

Lu, et al., "Plamprint recognition using eigenpalms features", vol. 24, No. 9-10, Jun. 2003, pp. 1463-1467.

* cited by examiner

PERSONAL IDENTIFICATION DEVICE AND METHOD

BACKGROUND OF THE INVENTION

1. Field of the Invention

The present invention relates to a device and a method for identifying a person using the biological information of the person, or in particular the finger vein pattern of the person.

2. Description of the Related Art

Now that the security technique for personal belongings and information is considered critical, the biometrics identification using the biological information of the person is closely watched as a personal identification technique high in utility and confidentiality. The conventional biometrics identification techniques using the fingerprints, the iris, the voice, the face, the veins in the back of the hand or the finger veins have been conceived. Especially, the identification technique using the finger vein, which can be accomplished simply by applying light to the finger, has the great advantages of a low psychological resistance and a high anti-falsification characteristic due to the use of the internal information of an organism.

The identification using the finger veins is implemented in the following manner. Specifically, the infrared light incident on a finger from the back or side surface thereof is scattered in the finger and radiated outside. In the process, the hemoglobin in the blood absorbs more infrared light than the surrounding tissue. In the case where the image of the light radiated and transmitted from the thick of the finger is picked up, therefore, the blood vessels, i.e. the finger veins distributed under the skin of the thick of the finger are visible as a pattern of a dark shadow. This image is registered in advance, and the correlation is determined between this image and the image of an object finger to be checked. In this way, it is possible to determine whether the person involved is registered or not for personal identification.

An identification device using the finger veins is disclosed in JP-A-7-21373. This personal identification device has the feature that an image of a finger is picked up by attaching an optical fiber closely to the finger to minimize the loss of light power for picking up the image. JP-A-2002-83298, on the other hand, discloses a device and a method of personal identification operated in an environment requiring no-contact detection using an image of a finger vein pattern. Also, the device disclosed in JP-A-2003-30632 comprises a finger guide unit and a fingertip button switch to assure uniform image pickup conditions for each case of matching the finger vein pattern for identification.

The conventional techniques use a guide unit for fixing a finger in position or guiding the finger to the correct position in the identification device to pick up an image of the finger veins with a high reproducibility. The finger is inserted along the guide unit, so that the factors of fluctuations of the finger shape including the angle of the finger joints, the three-dimensional rotation angle of the finger about the center axis thereof and the distance from the camera are suppressed, thereby making it possible to pick up an image of the finger vein pattern with a highly reproducible shape.

The user not accustomed to the operation of the identification device, however, may erroneously insert or deform the finger by bringing the finger into contact with the finger guide unit, applying so strong a force to the finger as to bend the finger joint or inserting the finger at variable angles. The user who has long used the device, on the other hand, though capable of inserting the finger with a high reproducibility, may place the finger in a different way than at the time of registration for a reduced correlation with the registered pattern. Also, a willful user may insert a false finger of other than an organism or a finger with a falsified pattern attached thereon for registration or identification.

SUMMARY OF THE INVENTION

Accordingly, the object of this invention is to provide an easy-to-operate, highly accurate identification device which can prevent the erroneous insertion or deformation of a finger or the insertion of a false finger by a willful user.

Some typical personal identification devices disclosed in the invention to achieve the above-mentioned object are briefly described below.

According to one aspect of the invention, there is provided a personal identification device comprising an image pickup unit for picking up an image of finger veins, a light source for emitting light to be transmitted through the finger, an image operating unit for matching the image picked-up with an image registered in advance, a guide unit for indicating an image pickup position of the finger and a detection unit for detecting a contact between the finger and the guide unit.

According to another aspect of the invention, there is provided a personal identification device comprising a light source for emitting light reflected on the thick of a finger, a light source for emitting light transmitted through the forward end of the finger, a light-sensitive element for receiving the light from the light source for emitting the light transmitted through the forward end of the finger, display means for indicating information as a guide to correct use of the device. The device further comprises means for switching matching of all registered images and matching of only the registered images corresponding to the user in accordance with the degree of correlation in matching operation, and means for updating the registration data.

According to still another aspect of the invention, there is provided a personal identification device for preventing, at a low cost, the lowering in recognition capability of the finger vein identification device which otherwise might occur due to erroneous insertion of a finger into the device by the user not accustomed to the operation of the device or the insertion of a falsified finger by a willful user.

Other objects, features and advantages of the invention will become apparent from the following description of the embodiments of the invention taken in conjunction with the accompanying drawings.

DESCRIPTION OF THE EMBODIMENTS

Embodiments of the invention are described in detail below.

Figure 1:
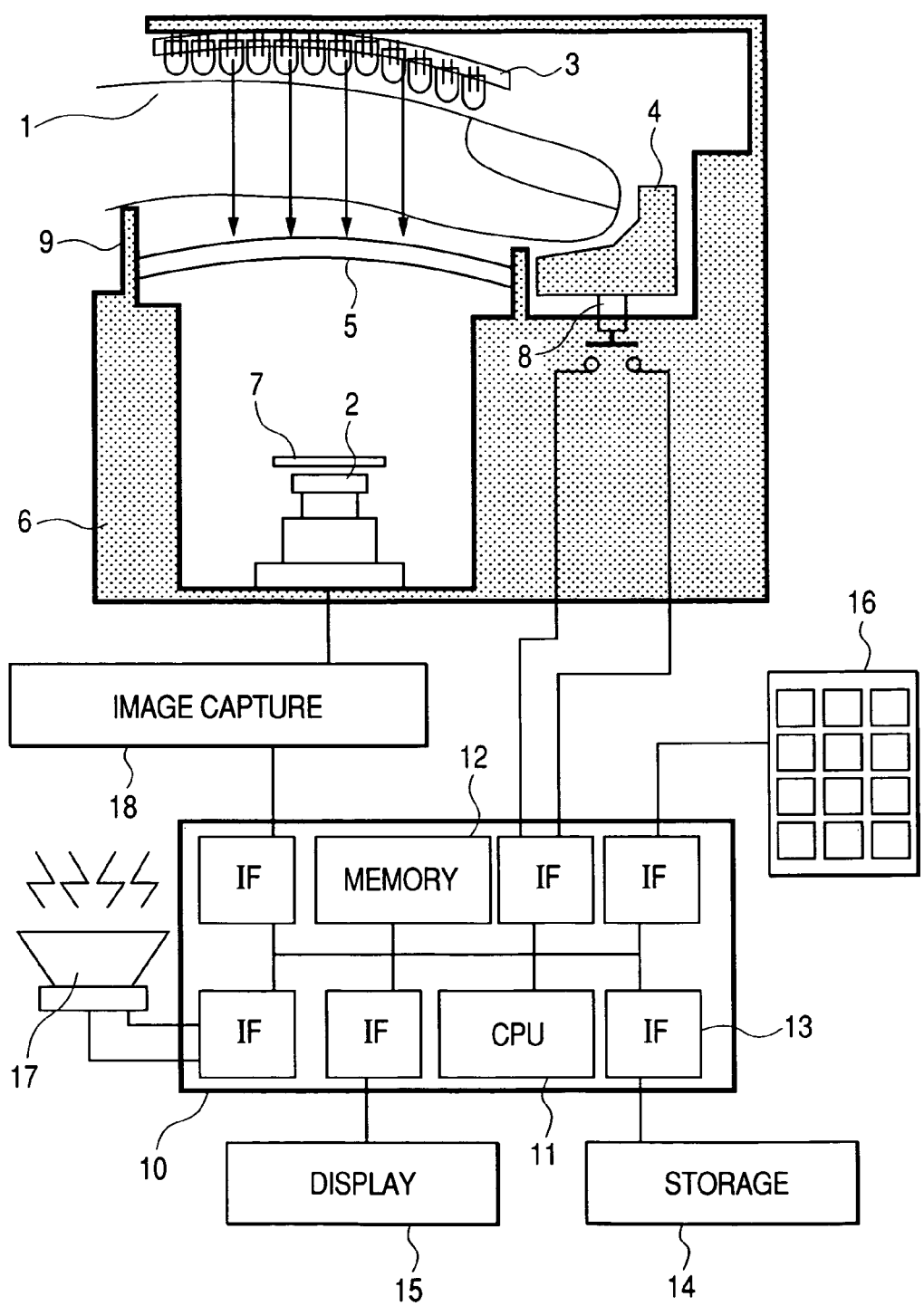
FIG. 1 shows an example of a configuration of a personal identification device embodying the invention.

FIG. 1 is a schematic diagram showing a system configuration for implementing the invention. The user inserts a finger 1 into an identification device 6 at the time of identification. In the process, the forward end of the finger 1 is placed on a fingertip guide unit 4 with the root of the finger 1 located on a finger position guide unit 9. Upon insertion of the finger 1 into the device, the identification process is started. The identification device 6 is shown in a side sectional view.

The identification process is executed in the steps described below. Specifically, the infrared light is radiated from a light source 3 on the back of the finger 1. The light is transmitted through the finger 1 and a finger insertion guide unit 5, and through an optical filter 7 for transmitting only the infrared light, reaches an image pickup device 2. The light is converted into an electrical signal by the image pickup device 2, and through an image capture 18, input to a computer 10. The image thus input is temporarily stored in a memory 12. A finger vein image registered in advance is stored from a storage 14 into the memory 12, and the input image is matched with the registered image by a CPU 11 according to a program stored in the memory 12. In the matching process, the correlation value between the two images to be compared is calculated, and in accordance with the value thus calculated, it is determined whether the input image is coincident with the registered image or not. In accordance with the result of matching, the process for identifying the user is executed, and in the case where the person is legitimately identified, the corresponding identification process is executed for the object to be controlled by the identification system.

The light source 3 is configured of a component part such as a LED (light emitting diode) or a halogen lamp for emitting infrared light. According to this embodiment, a plurality of LEDs are arranged longitudinally of the finger. As an alternative, a single elongated light-emitting element may be employed. The arrangement of the light source longitudinally of the finger makes it possible to radiate the light over the whole finger uniformly so that the whole finger vein pattern can be clearly acquired. All the LEDs may be controlled either at the same brightness or individually of each other. In controlling the LEDs individually, the light power for the portion such as the joint of the finger where the transmittance is high can be suppressed while increasing the light power for the thick portion of the finger. In this way, a clear finger vein pattern can be obtained.

An example of a method of controlling the light power from the light source 3 is explained below. First, with the LEDs radiating the light power of an initial value, the brightness value at the position of each area on the image where the LEDs are displayed is determined. Assume that the position of each LED on the image is known. In the case where the brightness is in the range considered appropriate, the light continues to be radiated with the same light power. In the case where the brightness is higher than the particular range, however, the light power of the LEDs corresponding to the related image position is reduced, and vice versa. This process is executed for each LED area. The change amount of the light power controlled may be a fixed value or a variable value.

An example of the operation of controlling the light power with a variable light power control change amount is described. First, the maximum initial value and the minimum initial value of the light power control range are determined for each LED. The light power control range is defined as a control value range of the LED light power output signal, and the light power is controlled not to exceed this range. The maximum initial value and the minimum initial value of the light power control range are determined in accordance with the characteristics of each LED. Next, the light power control values of all the LEDs are set at the center of the control range. Then, the light is radiated to obtain an image, and the brightness value at the position around each LED is determined.

In the case where the brightness value is low, the light power of the LED located at the particular position is required to be increased. The light power control value obtained by the previous check of the brightness value at the position around the particular LED is set as a new minimum value of the light power control range of the LED located at the particular position. After narrowing the control range, the control value of the light power radiated in the next stage is set at the center of the control range. As a result, stronger light power is radiated in the next stage than in the previous stage.

In the case where the brightness value is high, on the other hand, the light power of the LED at a corresponding position is required to be decreased. The light power control value previously obtained by checking the brightness value at the position around the particular LED is set to a new maximum value of the light power control range of the LED at the particular position. After narrowing the control range this way, the control value of the light power radiated in the next stage is set at the center of the control range. As a result, the light power smaller than in the previous stage is radiated in the next stage.

As long as the brightness of a LED is maintained at the proper value, the light power of the LED continues to be radiated without change. The brightness is determined and controlled in this way for all the LEDs until the light power of all the LEDs comes to remain unchanged.

According to this method, the change amount of the light power which is large in the beginning of the control operation is decreased progressively with the advance of the control operation. As compared with the fixed change amount, therefore, a fine control operation is possible while at the same time improving the processing speed. In view of the fact that the light power control range becomes narrower with the advance of the control operation, however, the control operation may fail to be accomplished in the case where the optimum control range cannot be determined. In order to solve this problem, the process for resetting the maximum and minimum light power control ranges at the initial state is executed for the area where the control operation fails to be accomplished after several control sessions. As a result, the control range can be widened again.

Embodiment 1

The identification process can be started by depressing an identification switch 8, or by continuing to retrieve the image of the finger 1 through the image capturing means 18 and determining through the CPU 11 that the finger 1 has been completely inserted. According to this embodiment, the former method is employed. As soon as the user depresses the fingertip guide unit 4 with his/her fingertip, the identification switch 8 is depressed. At the same time, a signal indicating the conduction of the identification switch 8 is transmitted into a computer 10 through an interface 13, so that the CPU 11 detects the depressed state of the identification switch 8, thereby starting the identification.

The fingertip guide unit 4 and the finger position guide unit 9, by supporting the finger 1 at two points, suppress the horizontal displacement of the finger 1, maintains a constant distance between the finger 1 and the image pickup unit 2, and holds the thick side of the finger 1 out of contact with the device. Should the thick side of the finger 1 come into contact with the device, the veins distributed in the thick of the finger would be pressed to stop the blood flow and the pattern would become invisible.

In the stage before determining the correlation of finger vein patterns with registered patterns, the image processing operation is executed to extract a finger vein pattern. An example of the method of finger vein pattern extraction is described below. The finger vein pattern assumes a lower bright value than the surrounding area free of blood vessels. Specifically, the brightness value profile of the cross section perpendicular to the direction in which the blood vessels run has a bottom or concave with a peak value at the center of each blood vessel. In all the vertical and horizontal profiles of the image, therefore, the center of the bottom or the concave of the brightness value is detected either by calculating the angle of aperture or the radius of curvature of the profile curve or by detecting the concaves based on the mean value theorem. The particular point at which the concave is detected is emphasized by increasing the brightness value thereof. Then, the center of each dark line of the whole image is emphasized and a finger vein pattern is extracted. Thus, the dark lines, which may be thin or in proximity to each other, can be emphasized positively and clearly even in the case where the light power has a fluctuation. Further, since the center of each blood vessel is extracted, the identification is made possible without being affected by the variations of the blood vessel width due to the expansion or contraction of the blood vessels caused by the change in atmospheric temperature or physical conditions.

Figure 2:
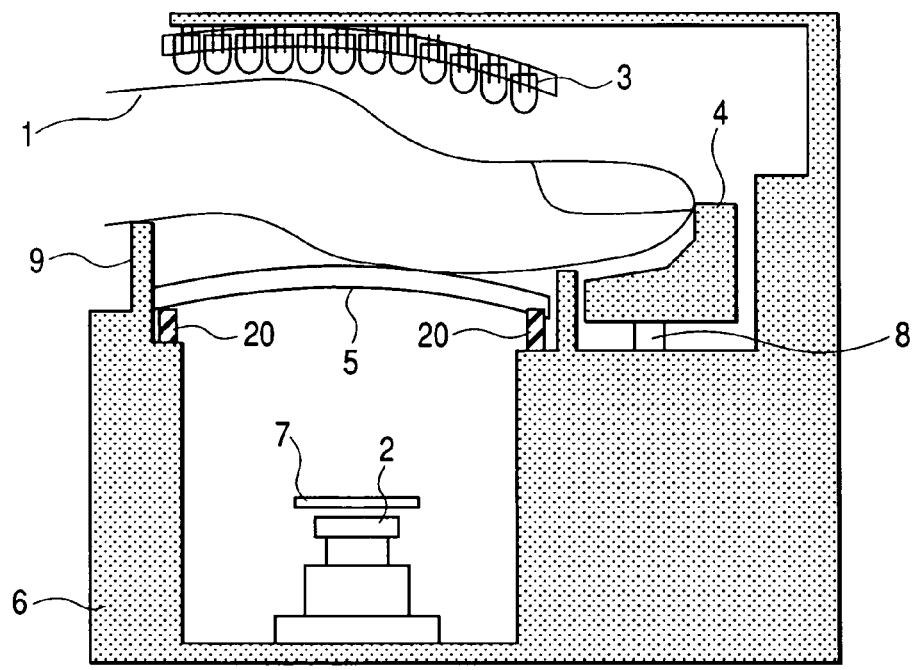
FIG. 2 shows an example of a configuration of a personal identification device for detecting the contact between a finger guide unit and a finger.

In the case where the identification process is started with the finger 1 not in contact with the finger position guide unit 9, the magnification of the finger 1 in the image is different from the finger 1 in contact with the finger position guide unit 9. In order to absorb this difference in magnification, the image is processed as described below. First, the contour of the finger displayed in the image is extracted either by applying an edge emphasizing filter over the whole image and checking the connection of lines or by following the edges sequentially to obtain the trace thereof or other conventional ordinary image processing methods. Next, the width of the finger contour acquired is determined by image processing to detect the joint portion of the finger and to determine the contour width at the particular position or to determine the contour width at the central portion of the image. After that, the magnification of the finger is normalized based on the contour width. The normalization is carried out either by reducing the whole image in the case where the contour width is larger than a specified value or by enlarging the whole image in the case where the contour width is smaller than a specified value thereby to set the contour width to the specified value, or by elastically enlarging or reducing the contour width to a specified value and correcting the two contour lines to parallel straight lines. As a result, the finger image picked up, even if partially enlarged or reduced, can be corrected to a predetermined magnification. Even in the case where the identification process is started with the finger 1 out of contact with the finger position guide unit 9, therefore, correction recognition is possible. FIG. 2 shows an example of the identification device for detecting the state of the finger 1 in contact with the finger insertion guide unit 5.

At the time of picking up an image of the finger vein pattern, the finger 1 is supported at two points of the finger position guide unit 9 and the fingertip guide unit 4 in order to keep the thick side of the finger 1 out of contact. In the process, application of a stress to the joint of the finger 1 with the fingertip as a supporting point would warp and curve the thick side of the finger 1. Then, the joint of the finger 1 would fluctuate vertically and therefore the reproducibility is reduced in each identification process. In order to prevent this inconvenience, the finger insertion guide unit 5 is provided to define a fluctuation-suppressing space.

In the case where the finger joint is moved vertically in the manner mentioned above, the thick side of the finger 1 comes into contact with the finger insertion guide unit 5. The resultant pressure of the contacted portion and the joint drive away the blood from the particular portions or the neighborhood thereof. In the case where the identification process is started by depressing the fingertip guide unit 4 or checking the inserted finger by image processing under this condition, the finger veins would not appear in the area of the first joint or the neighborhood thereof in the finger image picked up. As a result, the information on the features of the person is unavailable and the recognition rate is extremely reduced.

In order to detect the contact of the finger 1 with the finger insertion guide unit 5, a push button switch 20 is arranged at each supporting point of the finger insertion guide unit 5. With the depression of the whole finger insertion guide unit 5 by the finger 1, the push button switches 20 are also pushed down. This state is detected by the CPU 11, and as long as the push button switches 20 are pushed down, the identification process is not started even in the case where the identification switch 8 is depressed. The finger insertion guide unit 5 can be so shaped and configured as to be contacted when the thick side of the finger 1 is warped and curved by applying stress to the joint using the fingertip as a supporting point. As a result, the reduction in recognition rate is prevented which otherwise might be caused, by making it disable to execute the identification process due to the contact of the finger surface and the resulting lack of the vein pattern.

As a means for detecting the finger contact, the push button switches 20 may be replaced with electrical, electrostatic or pressure contact sensors which are made of a material not cutting off or blocking the transmission of the infrared light and distributed over the surface of the finger insertion guide unit 5. Thus, the stroke required to depress the switches 20 is eliminated for an improved sensitivity to the contact. Also, the push button switch 20 may alternatively be arranged only at the portion of the finger insertion guide unit 5 which supports the fingertip or which supports the finger root. Under this condition, the finger insertion guide unit 5 and the identification device 6 are connected with each other. The connecting portion of the finger insertion unit 5 which lacks the push button switch 20 is so shaped that the finger insertion guide unit 5 is rotated slightly downward about the connecting portion and depresses the switch 20 when contacted by the finger 1. In this way, the process and the component parts required for the sensing operation of the push button switch 20 are eliminated for a reduced production cost of the device.

The contact between the finger 1 and the finger insertion guide unit 5 may be detected by image processing. An example of the image processing method utilizes the fact that the image with the finger contacted tends to have a brighter finger joint area than the image with no finger contacted. By evaluating this brightness, the finger contact can be detected. The method using the image processing totally eliminates the need of the push button switch 20, and therefore simplifies the device configuration for a lower device production cost.

Once the finger 1 and the push button switches 20 are contacted by each other or the identification process is started under that condition, the user can be informed of the contact of the finger 1 by an alarm issued from a display means 15 or a speaker 17. This promotes the recognition on the part of the user and improves the mastery of the device manipulation thereby preventing the reduction in recognition rate.

Embodiment 2

Figure 3:
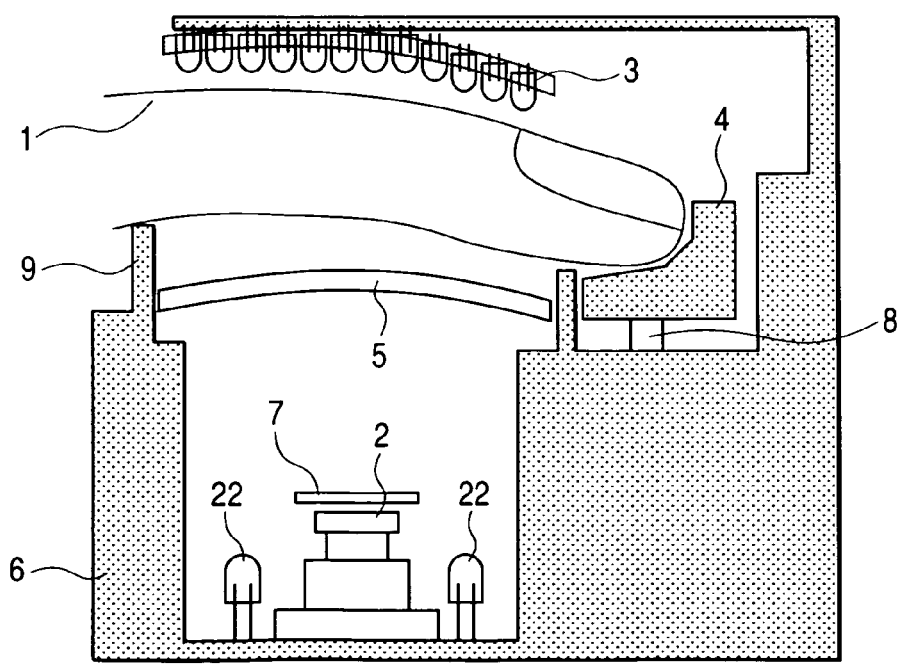
FIG. 3 shows an example of a configuration of a personal identification device for detecting the state of the surface of a finger.

FIG. 3 shows an example of a configuration of an identification device for detecting the surface state of the thick side of the finger 1. Reflected light sources 22 are arranged at positions for radiating the thick side of the finger 1. The reflected light sources 22 emit the light of a wavelength sufficient for transmission through an optical filter 7. The light power of the reflected light sources 22 is adjusted to a value capable of picking up an image of the finger surface.

In the case where the light from the light source 3 is radiated with the reflected light sources 22 turned off, an image having finger veins is picked up. In the case where the light from the reflected light sources 22 is radiated with the light source 3 off, on the other hand, an image of the finger surface is picked up. Specifically, the light source 3 is turned on while the reflected light sources 22 are turned off when performing the identification process. Immediately before or after the identification process, the on and off states of the light source 3 and the reflected light sources 22 are alternated with each other, so that the finger image is acquired by the light reflected from the finger surface and analyzed. In this way, it is determined whether the finger image acquired for identification is the proper one or not.

Figure 4A:
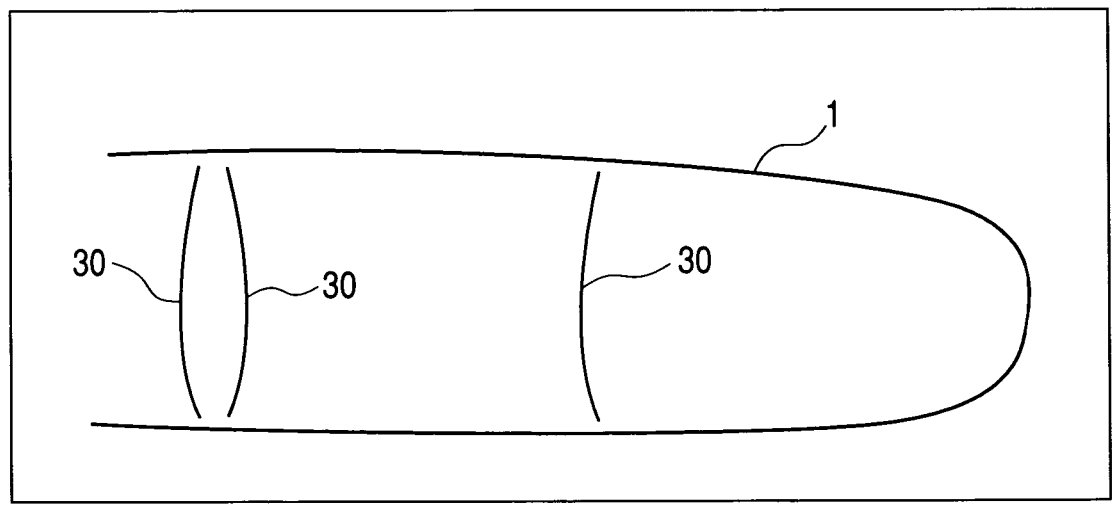
FIGS. 4A and 4B show examples of finger image due to the reflected light with the finger axis not turned and turned, respectively.
Figure 4B:
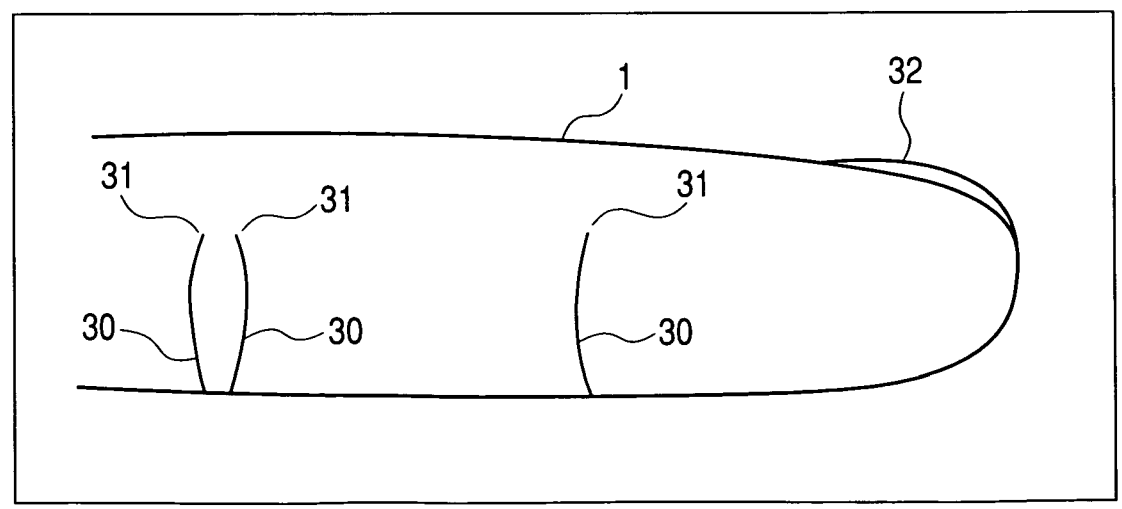

FIGS. 4A and 4B show examples of image of the finger surface picked up by the identification device of FIG. 3. In the case where the light from the reflected light sources 22 is radiated without the radiation from the light source 3, the finger vein pattern is substantially invisible. Nevertheless, the visual information of the finger surface such as wrinkles in the finger joint and a foul on the finger surface are picked up as an image.

FIG. 4A shows an image of the finger surface with the longitudinal direction of the finger not rotated about the center axis thereof. The joint wrinkles 30 are distributed vertically uniformly with respect to the center axis of the finger 1. FIG. 4B shows an image of the surface of the finger rotated about the center axis. The joint wrinkles 30 are displaced considerably to the lower side and have joint wrinkle ends 31. Further, the image of a nail 32 is seen to have been picked up on the side of the fingertip opposite to the direction in which the joint wrinkles 30 are displaced. In other words, the rotation of the finger 1 about the center axis can be determined by checking the picked-up image of the finger joint wrinkles 30 or the nail 32. In the case where this rotation is detected, the user is warned and the identification process is not executed. In this way, the recognition error is reduced. An example of the method of detecting the displacement of the position of the joint wrinkles 30 by image processing is described below. First, an image obtained is applied through an edge emphasizing filter thereby to emphasize the vertical component lines of the image. Next, the emphasized image is binarized and the lines are converted into thin lines. After that, it is determined by the line tracing process whether the lines are kept in juxtaposition vertically in continuous fashion. In the case where the lines represent the joint wrinkle portion, the tracing over a comparatively long distance is carried out. Based on the length of tracing, it is determined whether the wrinkles are those of the joint or not. After that, the position of an end point of each traced line segment is determined and the distance from the finger contour is calculated thereby to determine whether the position of each joint wrinkle end point 31 is displaced or not. On the other hand, the rotation of the finger 1 can be detected without determining the end points 31 of the joint wrinkle by calculating the center of gravity of the distribution of the joint wrinkles and determining whether the vertical positions of the joint wrinkles are displaced or not. Nevertheless, the displacement of the joint wrinkles 30 may be detected by using the conventional method based on the image recognition. This image processing makes possible the detection of the finger rotation without any special sensor and prevents the reduction in recognition rate without increasing the device production cost.

An example of image processing for detecting the nail 32 is described. First, the texture of an image is analyzed by an ordinary method such as the concentration histogram for small areas or the frequency component analysis. First, the texture analysis of the image is conduced by the ordinary method such as the histogram analysis for a small area or frequency component analysis thereby to subdivide the area. In the case a division area of at least predetermined area is connected to the upper or lower part of the fingertip or the neighborhood of the fingertip or in the case where comparison with the texture feature of the nail 32 statistically calculated shows an analogous area, then the particular part is determined as a nail 32. Nevertheless, other methods based on the conventional process of image recognition may be used for detecting the nail 32.

Figure 5A:
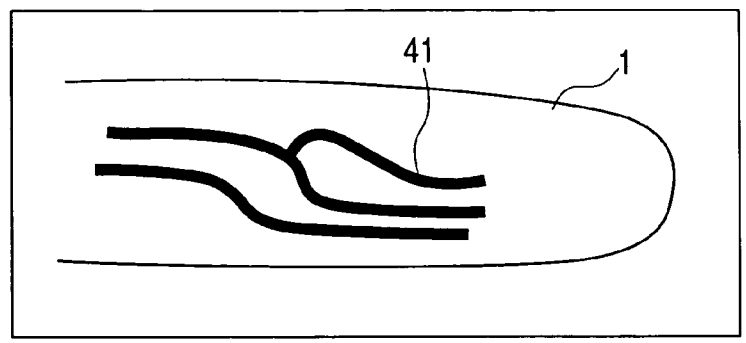
FIGS. 5A, 5B and 5C show examples of finger image due to the reflected light with a false pattern attached on the finger surface.
Figure 5B:
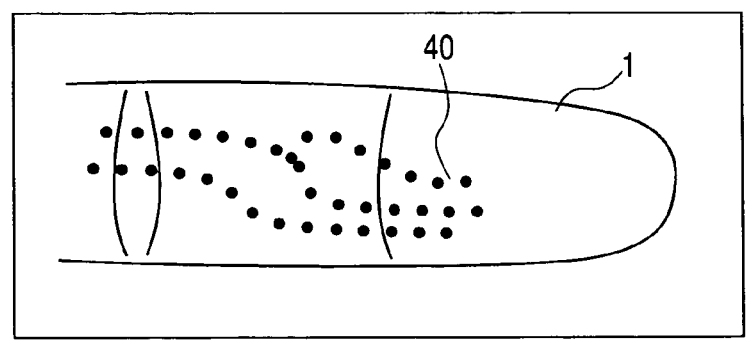
Figure 5C:
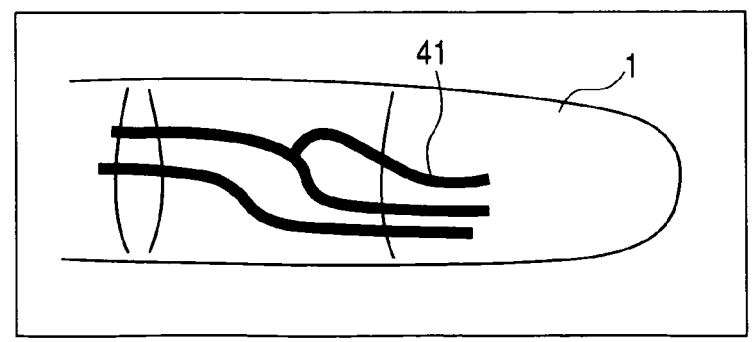

FIGS. 5A to 5C show images picked up by the identification device of FIG. 3 including a real finger of an organism and an image with a copied finger vein pattern attached thereon.

FIG. 5A shows an example of a finger image picked up with the light radiated from the light source 3 but not from the reflected light sources 22. A clear finger vein pattern 41 is observed. From this image, however, it is not known whether the finger veins are real or duplicate. Under this condition, the light source 3 is turned off while the light from the reflection light sources 22 is radiated. In the case where the finger vein pattern picked up as an image is that of a real organism, as shown in FIG. 5B, the finger vein pattern is substantially invisible or an unclear finger vein pattern 40 is recognizable. Assume, on the other hand, that a false finger vein pattern is drawn, with a material cutting off the light from the light source 3, on a sheet of a material through which the light from the light source 3 is transmissible or a translucent material and attached on the finger 1, or a pattern is drawn directly on the finger with a material cutting off the light. As shown in FIG. 5C, a finger vein pattern can be clearly recognized even with the light from the reflection light sources 22 alone. By determining whether a clear image of a finger vein pattern can be picked up with the reflected light alone, it can be determined whether a false pattern has been attached or not. In the case where a high correlation is determined between an image obtained by radiating light from the light source 3 alone and an image obtained by radiating the light from the reflection light sources 22 alone, however, it is determined that a false pattern is attached or directly drawn. Then, the user is warned through the display means 15 or the speaker 17, and no identification process is executed. In this way, the erroneous recognition of a false finger vein pattern is prevented.

Apart from the case in which a falsified finger vein pattern is attached, a foul or dust may exist on the finger surface, the finger insertion guide unit 5, the optical filter 7 or the image pickup device 2. In such a case, too, a clear pattern may appear on the finger image by radiation from the reflection light sources 22 alone. This is determined by detecting whether a significantly darker portion than the surrounding exists or not in the finger image picked up by the light radiated from the reflection light sources 22 alone. As a method of this detection, in the case where the value obtained by differentiating the interior of the finger area of the image exceeds a given threshold, for example, it is determined that a clear pattern exists at the particular position. Nevertheless, other conventional image processing methods may be used to detect a clearly visible pattern. In the case where the image is clearly visible at the same position at every session, it is determined that foul or dust is accumulated in the device. In the case where the position where a clear image is visible changes in each session, on the other hand, it is determined that a foul is attached on the finger. This result is notified to the user or the administrator through the display means 15 or the speaker 17. Then, based on this notification, the device can be cleansed or cleaned or other measures can be taken to prevent the reduction in recognition rate.

Embodiment 3

Figure 6:
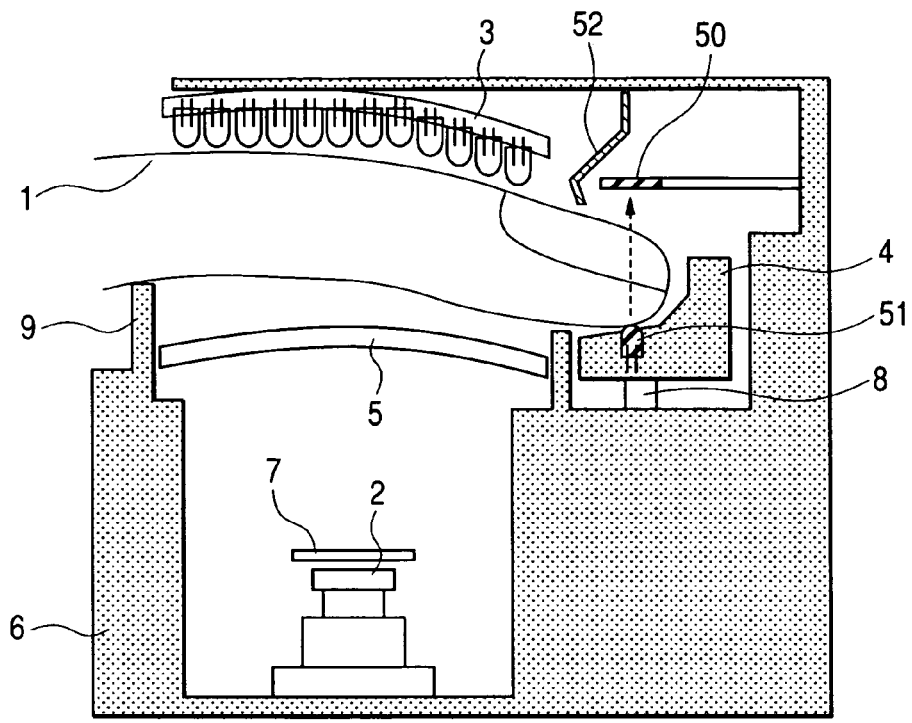
FIG. 6 shows an example of a configuration of a personal identification device for detecting a finger of an organism.

FIG. 6 shows an example of a configuration of a finger vein identification device for detecting a biological reaction of a finger. A light source for life recognition 51 is arranged in the fingertip guide unit 4, and a light-sensitive element 50 is arranged above the light source 51. The light source for life recognition 51 emits the infrared light which reaches the light-sensitive element 50 through the fingertip. In order to prevent the light of the light source 3, instead of the light of the light source for life recognition 51, from reaching the light-sensitive element 50, a light shield member 52 may be inserted between the light source 3 and the light-sensitive element 50. It is determined whether a finger is that of an organism or not from the fluctuation of the light power received by the light-sensitive element 50.

Figure 7:
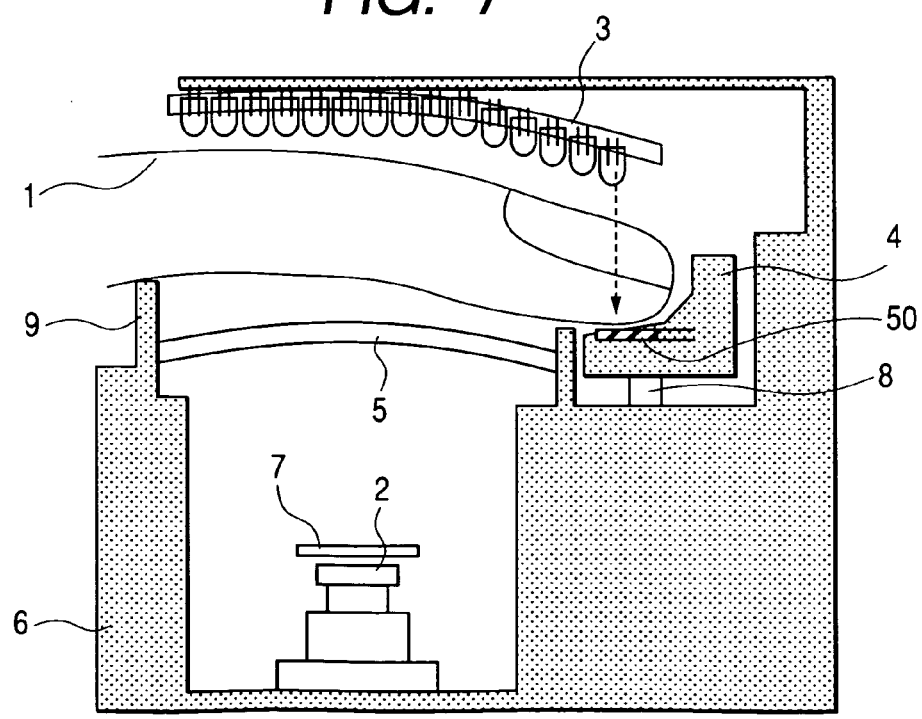
FIG. 7 shows an example of a configuration of a personal identification device for detecting a finger of an organism.

FIG. 7 shows an example of a configuration of a finger vein identification device for detecting a biological reaction of a finger. The difference from FIG. 6 lies in that the light source 3 for picking up an image of a finger vein pattern is used also as a light source for detecting an organism, and the light-sensitive element 50 is arranged in the fingertip guide unit 4. This reduces the number of component parts.

Figure 8:
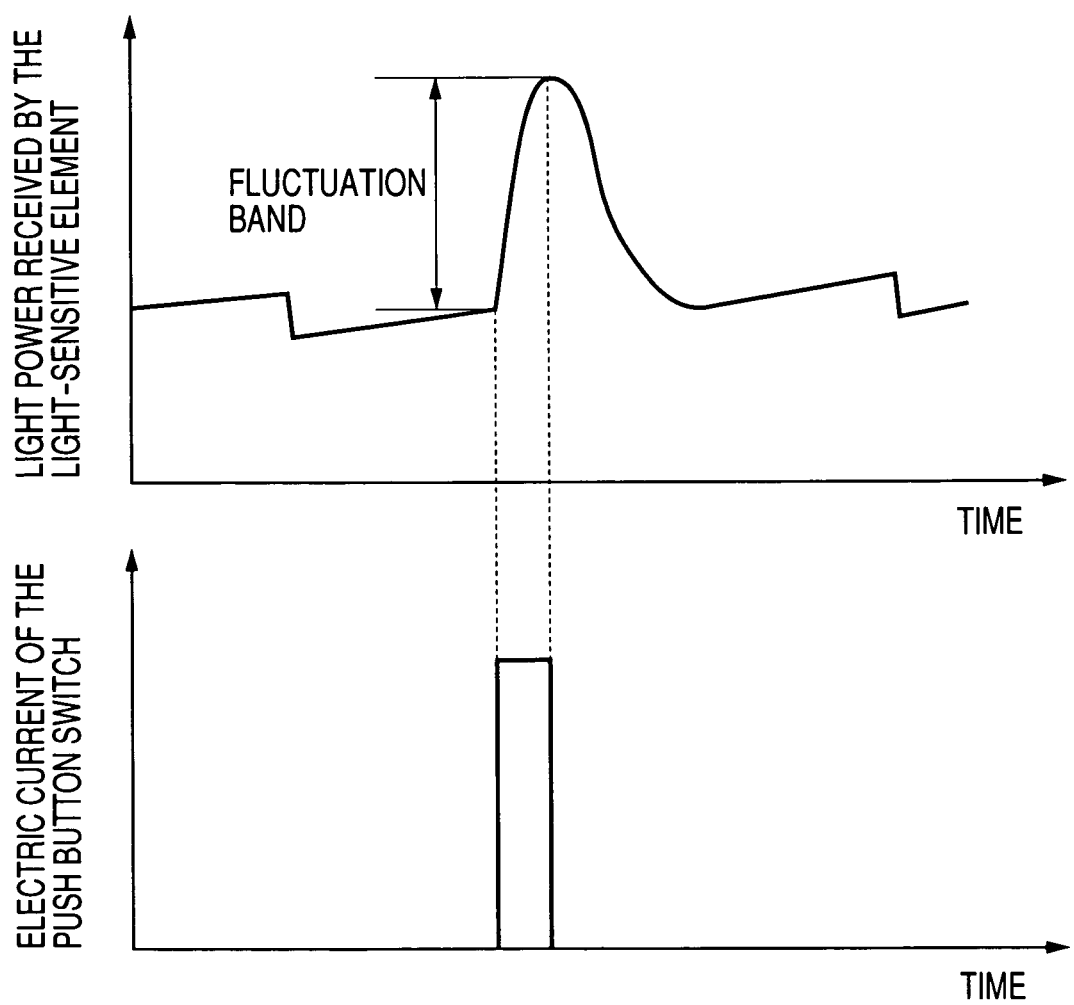
FIG. 8 shows an example of the fluctuation of the light power received by a light-sensitive element with an identification switch depressed.

FIG. 8 is an example of a timing chart for the light power of the light-sensitive element 50 and the identification switch 8 shown in FIG. 6 or 7. By checking the depression timing of the identification switch 8 and the fluctuation timing of the light power of the light-sensitive element 50, it can be determined whether the finger is an organism or not. In the case where the finger 1 is an organism, the light power of the light-sensitive element 50 undergoes no substantial change until immediately before the depression of the identification switch 8 with the finger 1 placed on the fingertip guide unit 4. In the process, no fluctuation occurs other than the fluctuation due to the finger displacement or a minor pulsation in synchronism with the heart beats. Once the identification switch 8 is depressed by the fingertip, the identification switch 8 is turned on and the amount of current flow is instantly increased. At the same time, the fingertip is pressed by the fingertip guide unit 4, and the amount of blood flow in the fingertip is reduced so that the transmittance of the light emitted from the light source for life recognition 51 is increased. As a result, the light power received by the light-sensitive element 50 increases in synchronism with the depression of the identification switch 8. With the reduction in the pressure for depressing the identification switch 8, the identification switch 8 is turned off, with the result that the blood flow rate in the fingertip increases and the light power received by the light-sensitive element 50 decreases gradually.

In the case where the finger 1 is not an organism but a falsification, no blood flows in the finger and therefore there is no pulsation before depression of the identification switch nor does the blood amount change at the fingertip at the time of depression of the identification switch. Thus, there is no fluctuation of the light power received by the light-sensitive element 50 as shown in FIG. 8. In this way, by checking the fluctuation of the light power received by the light-sensitive element 50 at the time of depressing the identification switch 8, it is determined whether a finger is an organism or a falsification.

Figure 9:
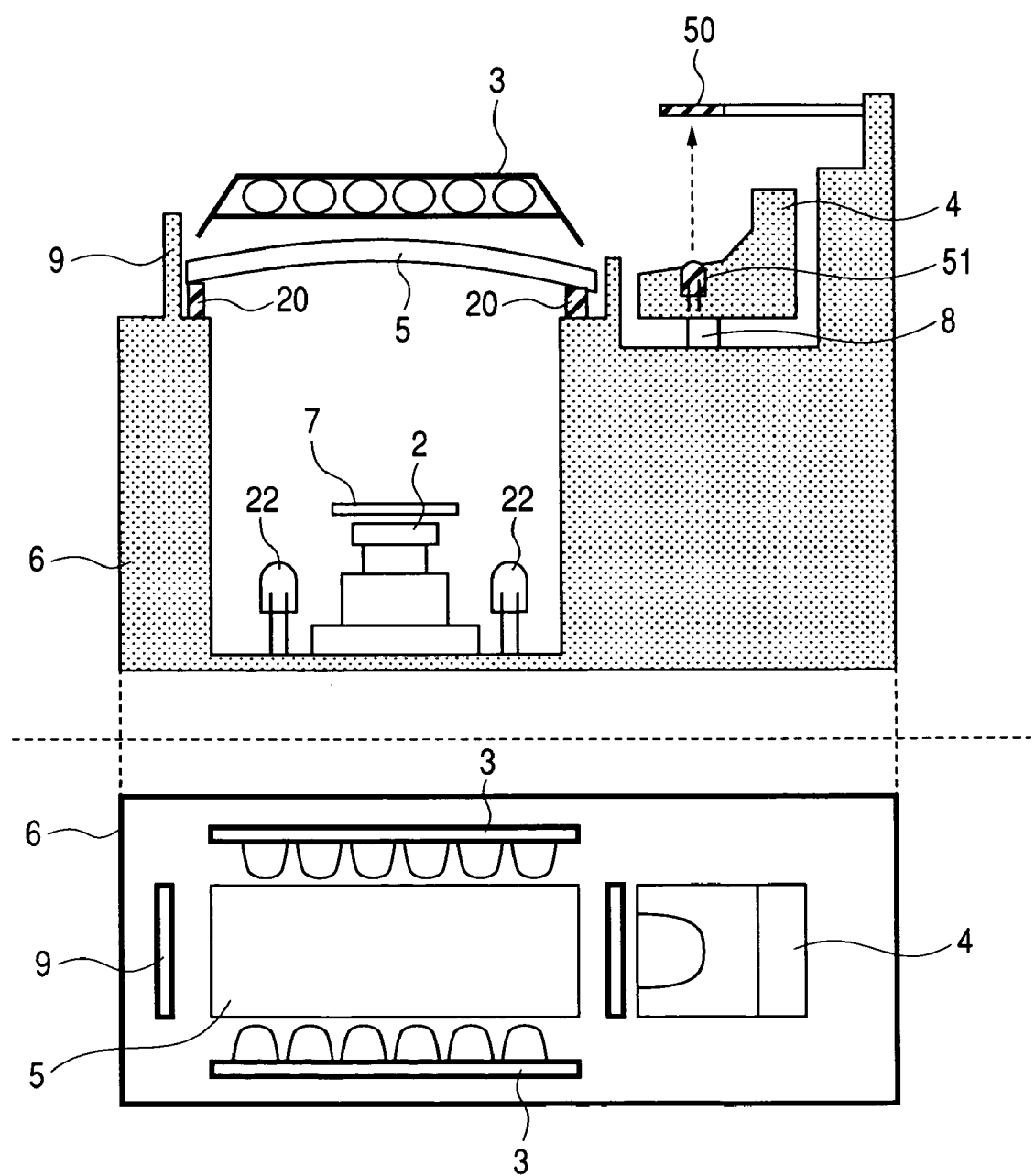
FIG. 9 shows an example of a configuration of a personal identification device for detecting the contact between a finger and a finger insertion guide having a light source using the light transmitted through the side surface of the finger, detecting the surface state of a finger and detecting a finger of an organism.

FIG. 9 shows an example of a configuration of an identification device having the functions of detecting the contact of the finger with the finger insertion guide unit 5, the state of the thick of the finger and an organism finger, wherein an image of the finger vein pattern is picked up by radiating the transmissible light from the side surface of the finger. The identification device 6 is shown as a side sectional view and a top plan view. The light source 3 is located on the side surface of the finger, and the upper portion of the identification device 6 is open. The light incident on the side surface of the finger is scattered in the finger and reaches the image pickup device 2 through the finger insertion guide unit 5 and the optical filter 7.

This identification device using the light transmissible through the side surface of the finger is different from the above-mentioned identification device only in the position of the light source 3. Like in the embodiment described above, the contact of the finger with the finger insertion guide 5, the state of the thick side of the finger and the finger as an organism can be detected.

Embodiment 4

Figure 10:
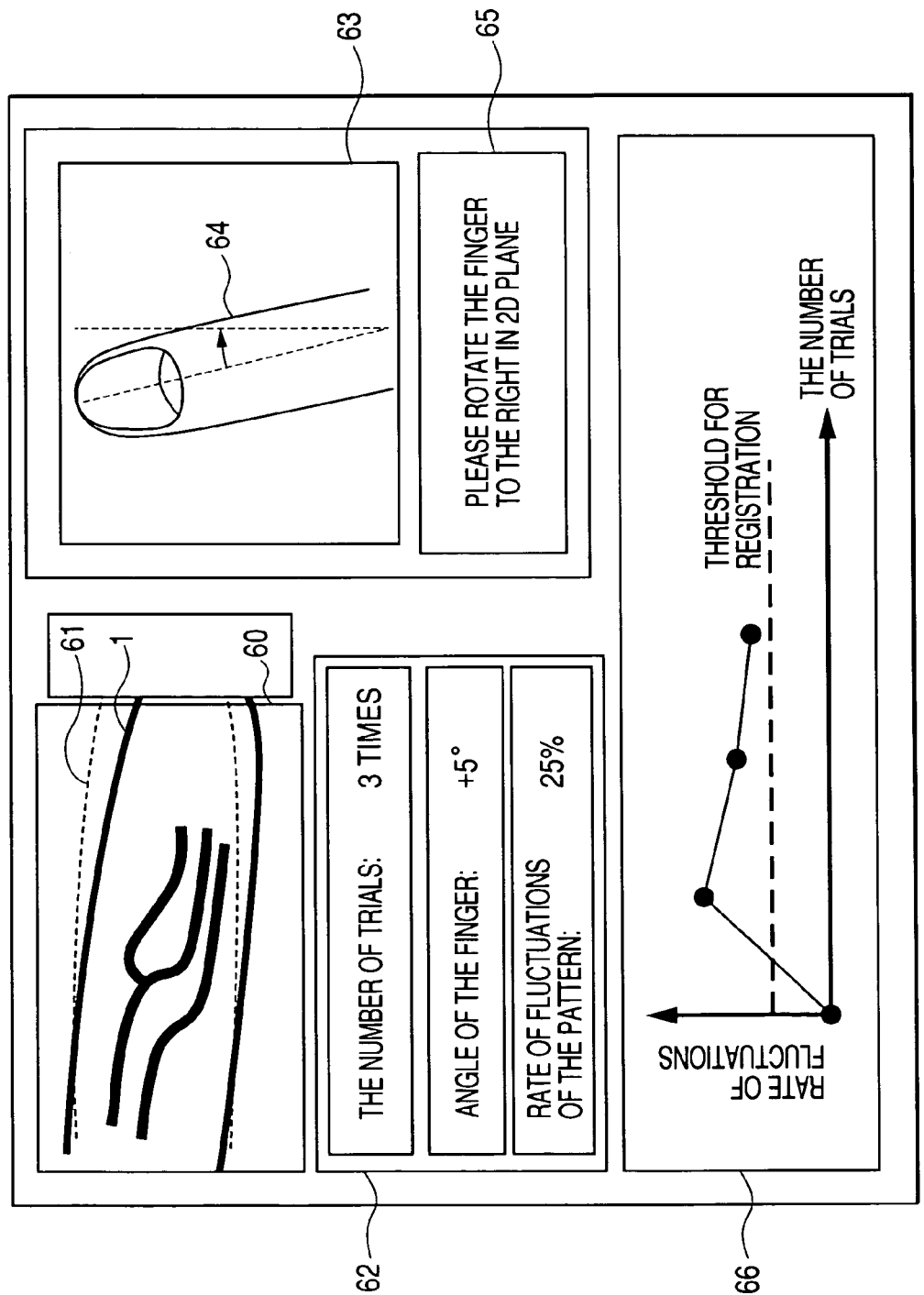
FIG. 10 shows an example of a screen for indicating the fluctuation of an inserted finger and guiding the user to insert the finger correctly.

FIG. 10 shows an example of a registration screen for displaying the state of finger insertion to guide the user to insert the finger correctly at the time of registration. Most of the users have are not yet accustomed to the operation of the identification device by the time of registration, and therefore required be guided to insert the finger. The image of the finger 1 picked up is displayed on a picked-up image monitor 60 through the display means 15, in superposition with a contour guide 61 providing a measure for setting the contour of the finger 1 in position. The user, while watching the image monitor 60, can set his/her finger in position. In the process, the finger state is expressed on a guidance statement display unit 65 in such words as "the finger 1 is rotated in a twodimensional (2D) plane", "the finger 1 is rotating about its center axis", "the finger 1 is in contact with the finger insertion guide unit 5", "the finger 1 is a falsification" or "a false finger vein pattern is attached o the finger 1". Further, a guidance diagram 64 indicating the finger state is displayed in the guidance display unit 63. Based on these information, the user can be informed of how to correct his/her finger state. In this way, the user can execute the process of registration correctly in accordance with the guidance on the screen. As a result, the job for registration on the part of the administrator is reduced and the administrator is not required to attend the user. Therefore, the burden on the administrator can be reduced.

More reliable registration data can be obtained not by one trial but by selecting the data suitable for registration out of several data obtained from several trials of finger insertion. Also, the user can be accustomed to the device operation more efficiently by informing the user of the difference of the present insertion state from the previous insertion state. An embodiment in which such information is presented for registration is described below.

Each time the user inserts a finger for registration, the finger vein pattern in the first trial or the past trial is matched, and the degree of pattern fluctuation is indicated in a matching result display unit 62 on the one hand and in a finger insertion fluctuation graph display unit 66 in time series on the other. Further, such information as the finger state and the reason for the fluctuation may also be displayed on the guidance display unit 63. The user, watching these history information, makes trials repeatedly and thus come to visually understand the fluctuations of the finger insertion in accordance with the manner in which the finger is inserted. Also, this history can be used in such a manner that in the case where the finger insertion undergoes large fluctuations, the data is nor registered while the finger vein pattern is registered only after small fluctuations continue. This registration can be carried out manually by the user or automatically by the system. Also, the registration data can be produced in a single or a plurality of sheets.

The information on the registration image shown in FIG. 10 may be transmitted, not by the information transmission means such as the display means 15 of FIG. 1, but by transmission means such as the speaker 17 using the voice to guide the user to insert his/her finger correctly. This registration method improves the degree to which the user is accustomed to the device operation while at the same time making it possible to acquire highly reliable registration data.

Embodiment 5

An embodiment is explained below in which the identification modes include the 1-N identification mode for matching all the registration images and the 1-1 verification mode for inputting the ID number to identify the user in advance and matching only a corresponding registered image. In the 1-N identification mode, the identification process is started immediately after the finger is inserted, while the identification process is started after the ID number is input using the input means 16 and the finger is inserted in the 1-1 verification mode.

Figure 11:
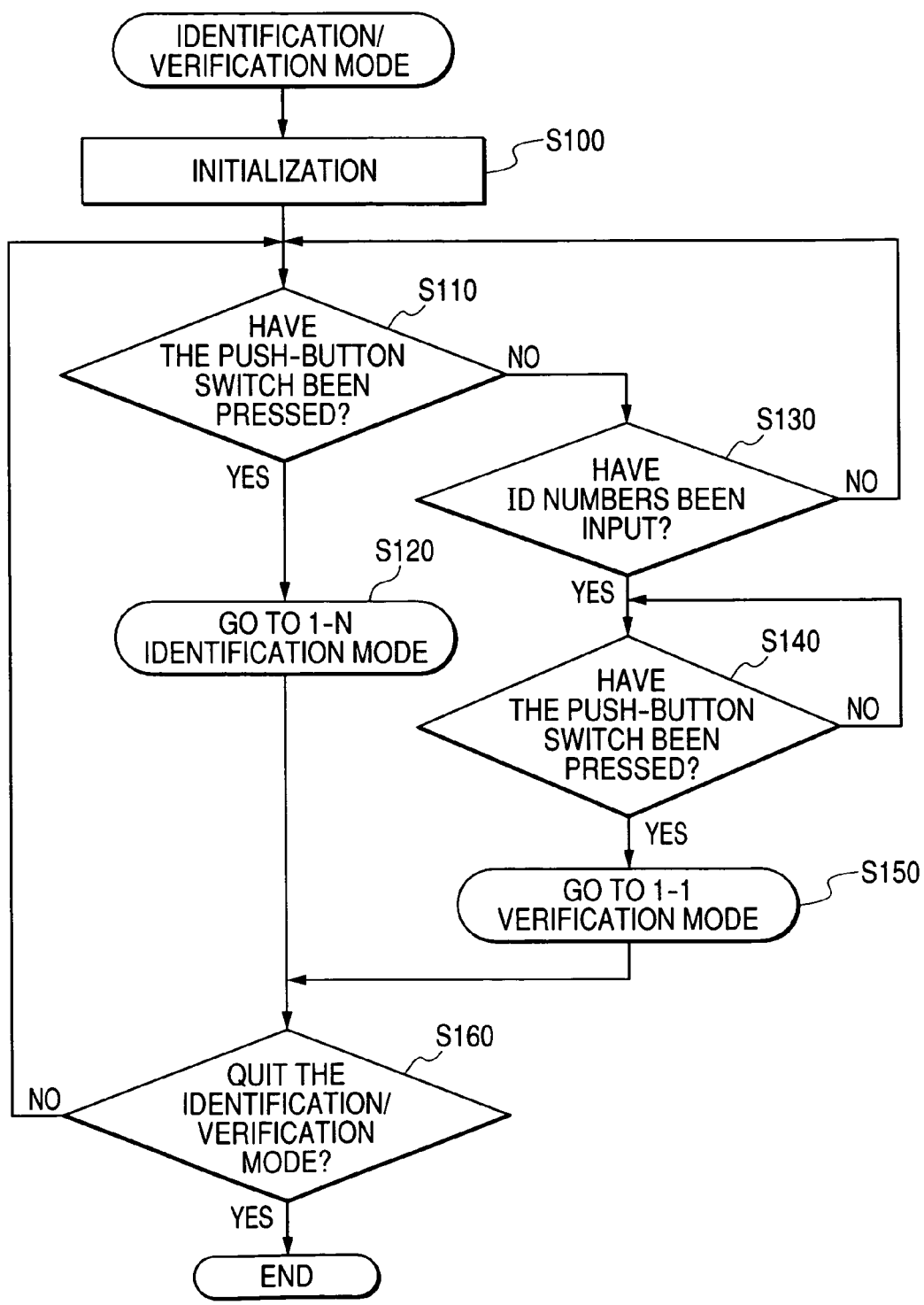
FIG. 11 shows an example of a flowchart for switching between the 1-N identification mode and the 1-1 verification mode.
Figure 12:
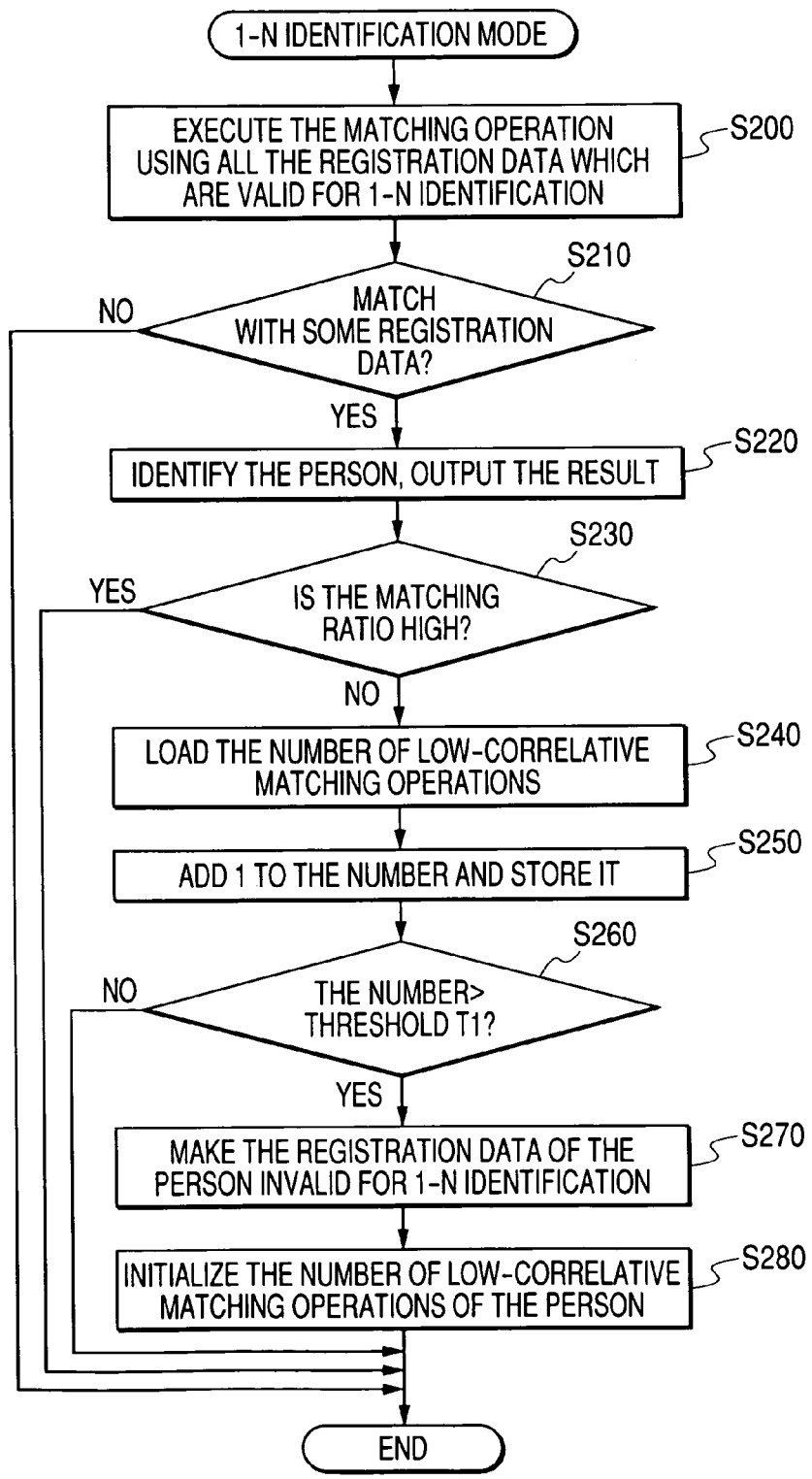
FIG. 12 shows an example of a flowchart for the 1-N identification mode to invalidate the 1-N identification.
Figure 13:
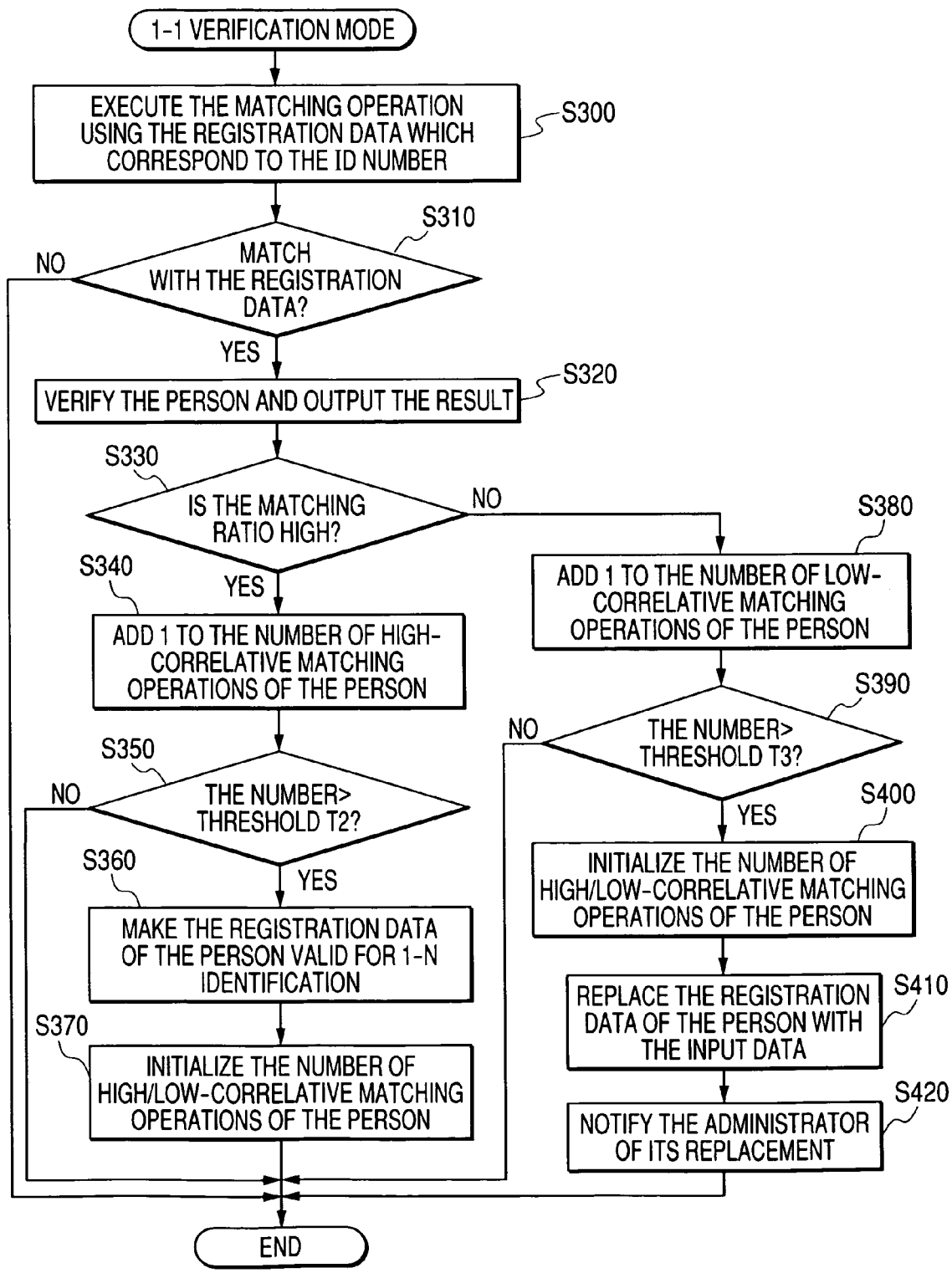
FIG. 13 shows an example of a flowchart for the 1-1 verification mode to validate the 1-N identification and update the registration data.

The result of identification and the information required for identification can be presented to the user by the display means 15 or the speaker 17. The display means usable for this purpose include a visual display, liquid crystal or a LED lamp. The sound issued from the speaker 17, on the other, includes a voice or beep. FIGS. 11, 12 and 13 show examples of flowchart showing the identification mode selectively switched between the 1-N identification mode and the 1-1 verification mode. In the 1-N identification mode, the identification process is executed simply by inserting a registered finger without inputting the information such as an ID number for identifying a person. The 1-N identification mode, therefore, is very convenient for the user. In view of the fact that the correlation threshold value for determining a registered person for matching with the registration data is shared by all the registered persons, however, the user whose correlation with his/her data tends to be low is liable to be rejected. In the 1-1 verification mode, on the other hand, the identification process is executed by finger insertion after inputting the information such as an ID number for specifying a person to be identified. According to this mode, though low in utility, a threshold can be set for each person and therefore the recognition rate of the user not sufficiently accustomed to the device manipulation is improved. According to this embodiment, the registration data has a validity/invalidity attribute of the 1-N identification, and by validating or invalidating the 1-N identification mode operation automatically, the two identification modes are switched for each person in a single system. Further, in the case where the correlation with the registration data is determined low, the registration data are automatically updated thereby to improve the utility and achieve a higher recognition rate.

FIG. 11 shows an example of a flowchart for switching the two identification/verification modes including 1-N identification and the 1-1 verification. First, step S100 is executed for initialization of the image pickup means 2, the light source 3 and the memory 12, for example. In step S110, it is determined whether the identification switch 8 has been depressed or not. In the case where the identification switch 8 has been depressed, the 1-N identification mode of step S120 is carried out. The 1-N identification mode is described in detail later with reference to FIG. 12. In the case where the identification switch 8 has not been depressed, on the other hand, it is determined in step S130 whether the ID number has been input or not. In the case where the ID number has been input and it is determined in step S140 that the identification switch 8 has been depressed, the 1-1 verification mode is carried out in step S150. The detail of the 1-N identification mode in step S120 is explained later with reference to FIG. 12. At the end of execution of each identification/verification mode, the process is ended in the case where the identification mode of the identification system is left in step S160. Otherwise, the identification mode is repeated. According to this process, the convenient 1-N identification mode and the reliable 1-1 verification mode are switched to realize a system having both high utility and high reliability.

FIG. 12 shows an example of a flowchart for the 1-N identification mode having the function of invalidating the 1-N identification for each user. In step S200, all the registration data in a valid 1-N identification mode are matched with the inserted finger thereby to calculate the pattern correlation. In step S210, it is determined whether the person involved is registered or not, using the correlation value. In the case where it is determined that the person is not registered, this mode is terminated. In the case where the person is registered, on the other hand, the person identified in step S220 is specified to execute the identification process. The identification process is defined as a process for opening the door, logging in to a PC, leaving an identification log or the like process corresponding to the identification system. Next, in step S230, it is determined whether the correlation value calculated in step S220 is sufficiently high or not. In the case where the correlation value is sufficiently high, this mode is terminated. In the case where the correlation value is not considered sufficiently high, on the other hand, the identification process is executed, but a high-correlative identification may have been impossible. In step S240, therefore, the number of low-correlative matching operations for the person is read, and the particular number plus one is stored again in step S250. Further, in step S260, it is determined whether the number of the low-correlative matching operations has exceeded the threshold value T1 or not. In the case where the number of the low-correlative matching operations has not exceeded the threshold value T1, this mode is terminated. In the case where the number of the low-correlative matching operations has exceeded the threshold value T1, on the other hand, it is determined that the low-correlative matching operations have been repeated successively or frequently, and the 1-N identification attribute of the registration data for the person is invalidated in step S270. As a result, the matching operation cannot be performed for the particular person in the 1-N identification mode any longer, and only the 1-1 verification mode becomes possible automatically. After that, the number of low-correlative matching operations is initialized to zero in step S280 thereby to terminate this mode. In the process, the user may be notified by voice, characters or turning on a lamp that the identification in the 1-N identification mode is impossible and that only the 1-1 verification mode for inputting the ID number each time is possible. In this way, according to the process shown in FIG. 12, the user who cannot be identified in the 1-N identification mode is switched automatically to the 1-1 verification mode for improved reliability.

FIG. 13 shows an example of a flowchart for the 1-1 verification mode having a function of validating the 1-N identification for each user and replacing the registration data accordingly. In step S300, the registration data corresponding to the input ID number is matched with the data on the inserted finger to calculate the correlation value. Subsequent steps S310 to S330 correspond to steps S210 to S230, respectively. In the case where it is determined in step S330 that the correlation value calculated is sufficiently high, the number of high-correlative matching operations for the particular person is incremented by one in step S340. Further, in step S350, it is determined whether the number of the high-correlative matching operations has exceeded the threshold T2 or not. In the case where the threshold T2 is not exceeded, this mode is terminated. In the case where the threshold T2 is exceeded, on the other hand, it indicates that the high-correlative matching operations have been carried out successively or frequently. Thus, the 1-N identification attribute of the registration data corresponding to the ID number is validated in step S360, and the number of low-correlative/high-correlative matching operations of the person are both initialized to zero in step S370. This verification mode is then terminated.

In the case where it is determined in step S330 that the calculated correlation is not considered sufficiently high, it is determined in step S390 whether the number of matching operations exceeds a predetermined threshold value T3 or not. In the case where the threshold value T3 is not exceeded, this verification mode is terminated. In the case where the threshold value T3 is exceeded, on the other hand, the number of low/high-correlative matching operations are initialized to zero in step S400. Further, in step S410, the registration data corresponding to the ID number are replaced by the currently input data. This data has already been correctly confirmed as data for the particular person, and therefore-the data of other persons cannot be intentionally registered, thereby maintaining the reliability of the data. In step S420, the substitution of the registration data is notified to the identification/verification system administrator, and this verification mode is terminated.

In step S410 shown in FIG. 13, the currently input data are replaced by the registration data. This corresponds to the automatic updating of the registration data. As a result, the user who cannot be identified in high-correlative matching operation due to a high correlation value in both 1-N identification mode and 1-1 verification mode can be increased to the highest correlation in terms of the present manner of finger insertion. This effect both improves the recognition rate of the user who has changed the manner of finger insertion for registration and the manner of finger insertion for practical application, and provides effective means against fluctuations in the finger vein pattern with time or variations in physical conditions, variations due to illness or physical growth. At the same time, a high recognition rate can be maintained without increasing the system operation cost by automatically updating the data. Also, the clarity of the finger vein pattern image for some users may be changed due to the fluctuation of the blood flow rate caused by the change in atmospheric temperature from one season to another. Especially in a season low in atmospheric temperature, the blood flow rate is reduced to such an extent that the correlation is decreased with the pattern registered in a season of high atmospheric temperature. This fluctuation is considered to occur slowly over several months. By replacing the registration data when the correlation is reduced, therefore, the registered pattern conforming with the present season is made available. In this way, the reduction in recognition rate can be prevented.

At the time point when the threshold value T1 is exceeded by the number of low-correlative matching operations in the 1-N identification mode shown in FIG. 12, the registration data may be replaced without proceeding through the 1-1 verification instead of invalidating the 1-N identification as in step S270. By doing so, the ID number input for 1-1 verification is eliminated and the practical application is made possible without adversely affecting the utility. In the case where the registration data are replaced through 1-N identification and 1-1 verification as in this embodiment, however, the registered person can be positively identified and the registration data can be more securely updated.

According to this embodiment, the registration data base is shared by 1-N identification and 1-1 verification, and the 1-N identification attribute is provided for each registration data to record the validity or invalidity of the 1-N identification. As an alternative, two data bases for 1-N identification and 1-1 verification may be prepared so that the validity/invalidity of the 1-N identification is switched by writing/deleting the data in the data base for 1-N identification. As a result, the 1-N identification and the 1-1 verification can be switched to each other without any special attribute of the data to be held, thereby reducing the amount of information stored.

In the identification/verification mode described above, a plurality of registration data may be held for one finger, so that a representative one of the registration data is matched in 1-N identification mode, while all the registration data are matched in 1-1 verification mode. In step S410 for replacing the registration data with input data, only one of the plurality of registration data is replaced for one finger. As a method of selecting the registration data to be replaced, for example, the oldest registration data is selected or the data with the smallest total correlation value of all the other registration data is selected. By matching a plurality of registration data in this way, the tolerance of matching against the fluctuations in finger insertion can be improved for a higher recognition rate. Also, in the case where a plurality of registration data classified by registration season are made available, a different identification process for the finger vein pattern can be executed in a different season, and thus the reduction in recognition rate is prevented.

In step S300 shown in FIG. 13, the ID number corresponds to one registered pattern. As an alternative, specified registered patterns may be regarded as one group and the group ID number may be input. In this case, all the plurality of registered patterns specified by the group ID number are matched. Nevertheless, the user can input only a short ID number for identification on the one hand, and the number of data to be matched is reduced on the other, thereby making possible high-speed processing.

The invention achieved by the present inventor has been described above specifically based on embodiments thereof. This invention, however, is not limited to these embodiments and of course modifiable variously without departing from the spirit and scope thereof. The reason for switching between 1-N identification and 1-1 verification shown in FIGS. 11 to 13, for example, is not limited to the finger identification, but applicable with equal effect to biometric identification of the finger or iris of which the matching pattern fluctuates with the physical conditions, illness, growth or season.

As described above, according to the invention developed by the present inventor, the erroneous insertion or deformation of the finger can be automatically detected. The finger vein pattern in an erroneous finger position is prevented from being registered, and the system administrator can completely prevent the erroneous finger insertion of a great number of persons without checking whether each finger is inserted correctly.

Also, it is possible to inexpensively prevent the reduction in recognition rate of the finger vein identification device due to the erroneous finger insertion by the user not accustomed to the device operation or the insertion of a false finger by a willful user.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A personal identification device comprising:
an image pickup unit;
a light source which emits light adapted to be transmitted through a finger to be incident on said image pickup unit;
an image operating unit which generates a pattern from an image picked up by said image pickup unit, and which matches the pattern of said image with a registered pattern registered in advance;
a finger-midsection insertion guide unit which indicates a position where the image of a midsection of a length of said finger is picked up; and
a detection unit which detects a contact between the midsection of said finger and said finger-midsection insertion guide unit.

2. A personal identification device according to claim 1, comprising:
an alarm unit configured to give an alarm indication to an owner of said finger;
wherein when said detection unit detects said contact, said alarm unit gives the alarm indication to said owner.

3. A personal identification device according to claim 1, wherein said detection unit is a switch unit configured to be depressed by said guide unit when said guide unit is depressed by said contact.

4. A personal identification device according to claim 1, wherein said detection unit is a contact sensor of selected one of an electric type, electrostatic capacity type and pressure type, to detect contact distributed over said guide unit.

5. A personal identification device according to claim 1, wherein said finger-midsection insertion guide unit has such a shape as to be contacted by extending said finger.

6. A personal identification device according to claim 1, comprising:
a switch unit configured to be depressed by the forward end tip-portion of said finger;
a light-sensitive element; and
a light source which emits light adapted to be transmitted through said forward end tip-portion of said finger, to be incident to said light-sensitive element;
wherein said light-sensitive element detects a fluctuation of light power, and said image operating unit matches said image responsive to depression of said switch unit, and
wherein it is determined whether said finger is falsified or not from the fluctuation of the light power received by said light-sensitive element between the time of said depression and the time before said depression of said switch unit.

7. A personal identification device according to claim 1, comprising a transmitter which transmits information to an owner of said finger;
wherein the information for guiding said finger to a normal insertion, is indicated through said information transmitter.

8. The personal identification device according to claim 1, wherein said image operating unit comprises said detection unit in which the contact is detected based on a brightness of the image.

9. A personal identification device according to claim 1, comprising a finger position guide unit that contacts with the finger at a point which is not an imaging area.

10. A blood vessel pattern image pickup apparatus for personal identification comprising:
an image pickup unit;
a finger-midsection insertion guide unit that contacts with the finger at a point which is not an imaging area;
a finger-midsection insertion guide to set a finger to be captured;
a finger position guide unit that contacts with the finger at a point which is not the imaging area;
a light source which emits light adapted to be transmitted through the finger and incident on said image pickup unit; and
a detection unit which detects a contact between a midsection of a length of said finger and said finger-midsection insertion guide unit.

11. A personal identification device comprising:
an image pickup unit;
a light source which emits light adapted to be transmitted through a finger to be incident on said image pickup unit;
an image operating unit which generates a pattern from an image picked up by said image pickup unit, and which matches the pattern of said image with a registered pattern registered in advance;
a finger-tip detection unit which detects a contact between a finger-tip, as an indicator of insertion of the finger into the personal identification device;
a finger-midsection insertion guide unit which indicates a position where the image of a midsection of a length of said finger is picked up; and
a detection unit which detects a contact between the midsection of said finger and said finger-midsection insertion guide unit.

* * * * *